United States Patent [19]

Speak

[11] Patent Number: 4,850,088
[45] Date of Patent: Jul. 25, 1989

[54] SELF-LOADING CONTROLLED DEFLECTION ROLL

[75] Inventor: John M. Speak, Bury, England

[73] Assignee: Beloit Corporation, Beloit, Wis.

[21] Appl. No.: 219,531

[22] Filed: Jul. 15, 1988

[30] Foreign Application Priority Data

Aug. 8, 1987 [GB] United Kingdom ............... 8718823

[51] Int. Cl.[4] .......................................... B21B 27/00
[52] U.S. Cl. ................................ 29/116.2; 29/123; 29/129.5; 29/130
[58] Field of Search .............. 29/116.1, 116.2, 115, 29/123, 129.5, 130; 100/163 A, 162 B, 164, 156, 170, 171, 172, 160

[56] References Cited

U.S. PATENT DOCUMENTS

| | | | |
|---|---|---|---|
| Re. 26,219 | 6/1967 | Kusters et al. | 100/170 |
| 3,119,324 | 1/1964 | Justus | 100/170 |
| 3,885,283 | 5/1975 | Biondetti | 29/116.2 OR |
| 3,997,952 | 12/1976 | Lehmann et al. | 29/116.2 X |
| 4,213,232 | 7/1980 | Biondetti et al. | 29/116.2 OR |
| 4,249,290 | 2/1981 | Lehmann | 29/116.2 OR |
| 4,291,447 | 9/1981 | Marchioro | 29/116.2 OR |
| 4,296,537 | 10/1981 | Küters et al. | 29/116.2 |
| 4,299,162 | 11/1981 | Hartmann et al. | 100/43 OR |
| 4,319,389 | 3/1982 | Marchioro | 29/116.2 OR |
| 4,327,468 | 5/1982 | Kusters et al. | 29/116.2 OR |
| 4,520,723 | 6/1985 | Pav et al. | 100/162 B |
| 4,620,348 | 11/1986 | Guttinger | 29/116.2 OR |
| 4,625,637 | 12/1986 | Pav et al. | 100/47 |
| 4,637,109 | 1/1987 | Bryer | 29/116.2 |

FOREIGN PATENT DOCUMENTS 1433435 4/1976 United Kingdom .

Primary Examiner—Timothy V. Eley
Assistant Examiner—Irene Cuda
Attorney, Agent, or Firm—Dirk J. Veneman; Raymond W. Campbell; Gerald A. Mathews

[57] ABSTRACT

A controlled deflection roll of the self-loading type has a shaft about which a tubular shell is disposed. The roll shell is rotatably mounted on bearings at each end which, in turn, are mounted about corresponding bearing rings. The bearing rings are spaced about the shaft and are pivotally linked with the shaft at each end with a pair of pivot arms. Each of the pivot arms at either end of the roll have one end pivoted to the corresponding bearing ring and the other end pivoted to the shaft with both the shaft pivots and bearing ring pivots being located diametrically opposite one another with respect to the longitudinal axis of the shaft. This arrangement allows approximately straight line transverse movement of the roll shell relative to the longitudinal axis of the shaft about the pivot connections. The controlled deflection roll can thereby be loaded into nipping engagement with another roll and unloaded solely by pressure means disposed between the shaft and the inner surface of the roll shell without requiring movement of the shaft.

8 Claims, 4 Drawing Sheets

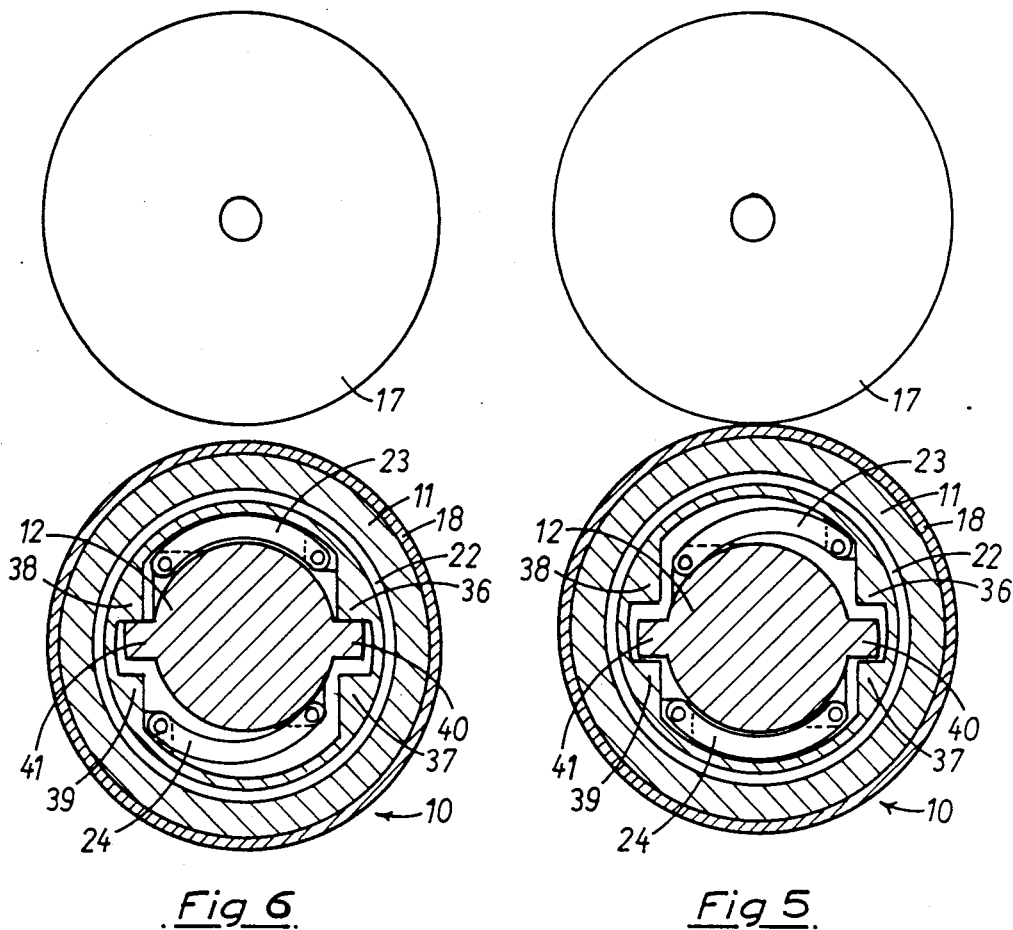
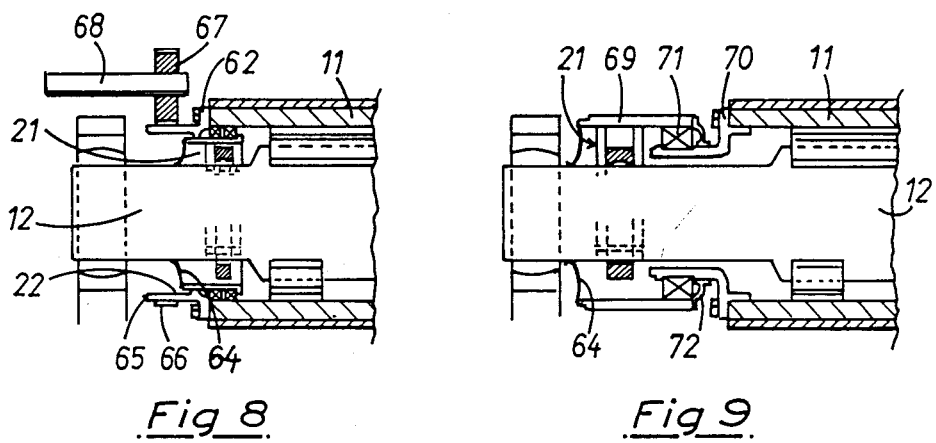

SELF-LOADING CONTROLLED DEFLECTION ROLL

BACKGROUND OF THE INVENTION

The present invention relates to press rolls such as are used for applying pressure to traveling, endless webs such as ar produced, for example, in a papermaking machine.

More particularly, this invention relates to a so-called self-loading controlled deflection roll wherein the roll shell is transversely movable relative to the roll shaft to effect nipping engagement and disengagement of the roll shell with another roll without having to move the roll shaft.

Many forms of press rolls comprise a cylindrical shell rotatable about a stationery beam which is provided with hydrostatic or hydrodynamic support means guided in the support beam for providing a supporting and loading force to the inside of the rotatable shell. In many cases, guide means are also provided for constraining the cylindrical shell relative to the support beam such that the longitudinal axis of the shell moves only in a plane containing the longitudinal access of the beam. In such cases, movement of the shell is toward and away from an opposing roll for the purpose of closing or opening the nip between the cylindrical shell and the opposing roll.

SUMMARY OF THE INVENTION

According to the present invention, there is provided a press roll comprising a stationary beam, or center shaft, and a cylindrical shell rotatable about the beam, or center shaft, and movable into and out of engagement with an opposing roll to establish or discontinue pressing engagement therewith. At least one hydrostatic or hydrodynamic support means is carried by the beam and extends along the working length thereof corresponding essentially to the length of the roll shell for establishing a pattern of pressure between the roll shell and the opposing roll when in pressing engagement therewith. A linkage system acts between the cylindrical shell and the beam for constraining the longitudinal axis of the cylindrical shell to move in an arcuate path transversely relative to the longitudinal axis of the beam.

The linkage system comprises an annular ring disposed about the support beam at either end of the cylindrical roll, and a pair of links at each end of the roll, each link having one end pivotally connected to the support beam and the other end pivotally connected to the annular ring. Each link extends transversely of the intended direction of roll shell movement into and out of engagement with a mating roll. The end of both links at each end of the roll which is pivoted to the shaft are on diametrically opposite sides of the shaft. Similarly, the pivoted ends of each link on the same end of the roll which are attached to the bearing ring are located on diametrically opposite sides of the shaft. This arrangement permits the roll shell to move transversely relative to the shaft with a very small arcuate motion about the pivot points between the links, shaft and bearing rings. In addition, the arcuate motion of the corresponding links at either end of the roll shaft are compensated by opposite rotational movement of the corresponding links at either end of the roll on the other side of the shaft. This minimizes the arcuate motion of the roll shell while permitting the desired translational movement.

At either, or both, end regions of the cylindrical shell, the annular bearing ring may be disposed within the axial length of the roll shell or may be disposed outside the axial length of the cylindrical roll shell. When the annular bearing ring is disposed within the axial length of the cylindrical shell, the shell is preferably journaled on the outside of the annular ring. When, however, the annular ring is disposed outside the axial length of the cylindrical shell, or, indeed, outside in the extension thereof, the cylindrical shell can alternatively be journaled inside the annular bearing ring.

While a single long support means, operating hydrostatically or hydrodynamically, can be used to support the roll shell on the shaft, it is preferable that one or more rows of support elements are provided along substantially the entire length of the cylindrical roll. Each support element can preferably be controlled independently such as in a manner disclosed in U.S. Pat. Nos. 3,119,324 and Re. 26,219. Each support element can be in the form of a piston member disposed in the hydraulic cylinder, or chamber, in the support beam, and a plurality of channels, or bores, are formed in the support beam, each communicating with an individual hydraulic cylinder and extending through one, or the other, end of the support beam for connection by external conduits, each through suitable valve means, to a source of hydraulic pressure fluid, such as oil. Each piston has a shoe at its outer end for supporting and loading the cylindrical shell through its inner surface.

With hydrodynamic support means, the radially outer surface of each shoe is substantially continuous, and means are provided to establish a hydrodynamic film of lubricant between the surface of the shoe and the internal surface of the cylindrical roll shell to thereby rotatably support the roll shell.

With hydrostatic support means, the radially outer surface of each shoe communicates within the cylinder, or bore, in which it is slidably received by means of one or more throttling conduits extending through the piston and shoe. The hydraulic pressure fluid can thereby flow into the space between the surface of the shoe and the inner surface of the cylindrical roll shell and serve as a lubricant at the interface between the rotating roll shell and the stationary shoe.

Preferably, a pair of opposing hydrostatic or hydrodynamic means are provided at each end region of the cylindrical roll shell to act in the opposite direction to the support means. In a manner similar to the roll shell support means, means are provided to enable the hydraulic pressure fluid acting on each of the opposing means to be controlled externally of the press roll. Control of the pressure of hydraulic fluid acting on the support means, and on the opposing means, enables the cylindrical roll to be positively moved away from, as well as towards, the opposing roll regardless of whether the opposing roll is above or below the self-loading roll.

Accordingly, it is an object of this invention to provide a self-loading type of controlled deflection roll wherein the roll shell is pivotally linked with the roll shaft for guiding the roll shell in translational movement relative to the shaft.

Another object of this invention is to provide a self-loading controlled deflection type roll wherein transverse movement of the roll shell about the roll shaft is controlled by a four-bar linkage.

An object, feature and advantage of this invention is that the bearing ring need not support the combined weight of the roll shell as well as the force of the nip load against the mating roll.

These, and other objects, features and advantages of this invention will be readily apparent to those skilled in the art upon reading the description of the preferred embodiment in conjunction with the attached drawings.

IN THE DRAWINGS

FIG. 5 is a cross-sectional end view similar to the apparatus shown in FIG. 3, but illustrating the cylindrical roll shell in pressing engagement with its mating roll.

FIG. 6 is a cross-sectional end view of the apparatus similar to that shown in FIG. 3, but illustrating the cylindrical roll shell withdrawn out of nipping contact with its mating roll.

FIG. 8 is a side-elevational view, partially in section, of one end of the press roll of this invention, and illustrating how the press roll shell can be driven.

FIG. 9 is a side-elevational view, partially in section, of one end of the press roll of this invention, and illustrating an alternative arrangement in which the linkage system is disposed outside the longitudinal length of the cylindrical roll shell.

DESCRIPTION OF THE PREFERRED EMBODIMENTS

Figure 1:
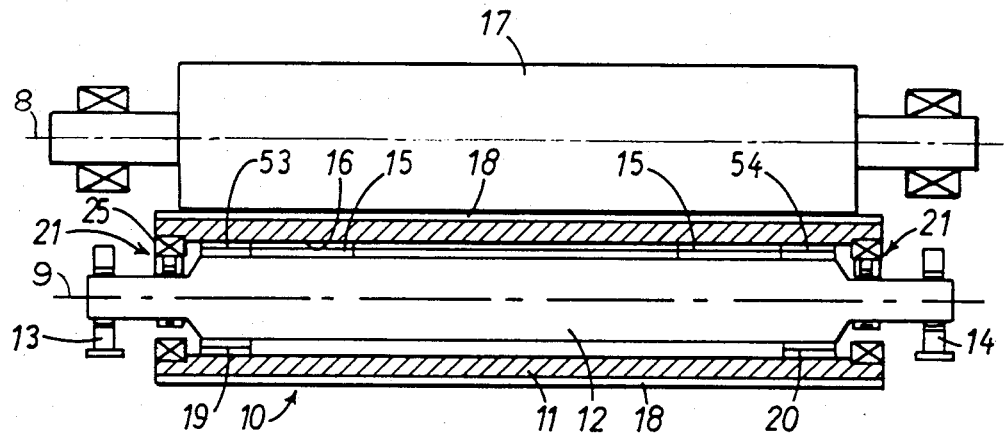
FIG. 1 is a side-elevational view of the roll of this invention, partially in section, which is shown in nipping engagement with a mating roll.

Referring to FIG. 1, a self-loading press roll 10 of this invention is shown in cross section. The press roll comprises a cylindrical, or tubular, roll shell 11 which is rotatable about a support beam 12 supported at its ends by support stands 13,14. The support beam 12 is provided with hydrostatic or hydrodynamic support means 15 extending longitudinally along the beam for substantially its entire length so as to provide support for the roll shell along substantially its entire working face length. These hydrostatic or hydrodynamic support means are commonly referred to as "shoes" in the industry and operate to support the cylindrical roll shell by bearing against its internal surface 16 to urge the external surface of the cylindrical shell into pressing, or nipping, engagement with an opposing, or mating, roll 17. The cylindrical roll shell 11 preferably has its external surface covered by a roll cover 18, which typically takes the form of an elastomeric material, for engagement with a moving, endless web which passes, typically with a felt, between the nip line of contact between rolls 10 and 17.

The hydrostatic or hydrodynamic support shoes 15 can be controlled individually, as will be hereinafter described, so it is possible to establish a uniform pressure pattern, or a predetermined pressure pattern along the hip line of contact between the press roll 10 and the opposing roll 17 when they are brought into engagement. Further, by providing opposing hydrostatic or hydrodynamic support means 19,20 in the end regions of the cylindrical roll shell 11, and acting in the opposite direction to the hydrostatic or hydrodynamic support means 15, it is possible, by controlling the pressure of hydraulic fluid acting on the opposing means, in conjunction with the control of the pressure of hydraulic fluid acting on the support means 15, to move the press roll 10 positively into, and out of, engagement with the opposing roll 17.

A linkage system 21 is provided at each end of the cylindrical roll shell 11 to constrain movement of the cylindrical shell translationally such that its longitudinal axis is moved along an arcuate path relative to the longitudinal axis of the support beam 12 as will be hereinafter described.

The linkage system 21 is illustrated in greater detail in FIGS. 2, 3, 5, 6 and 9. The linkage system comprises an annular bearing ring 22 disposed about the support beam 12 and a pair of links, or arms, 23,24. A similar linkage system is at either end of the roll to provide uniformity of motion and support at both ends of the roll. The cylindrical roll shell 11 is journaled to the annular bearing ring at 25 and the annular ring 22 is disposed just inside either end of the cylindrical roll shell 11. The annular ring 22 has two pairs of axially spaced, radially inwardly projecting, lugs. One such pair of lugs 26,27 is visible in FIG. 2, while of the other pair, only one lug 28 is visible in FIG. 3. The pivot pins 32, 35 of these lugs are preferably located on diametrically opposite sides of the annular bearing ring 22.

Figure 2:
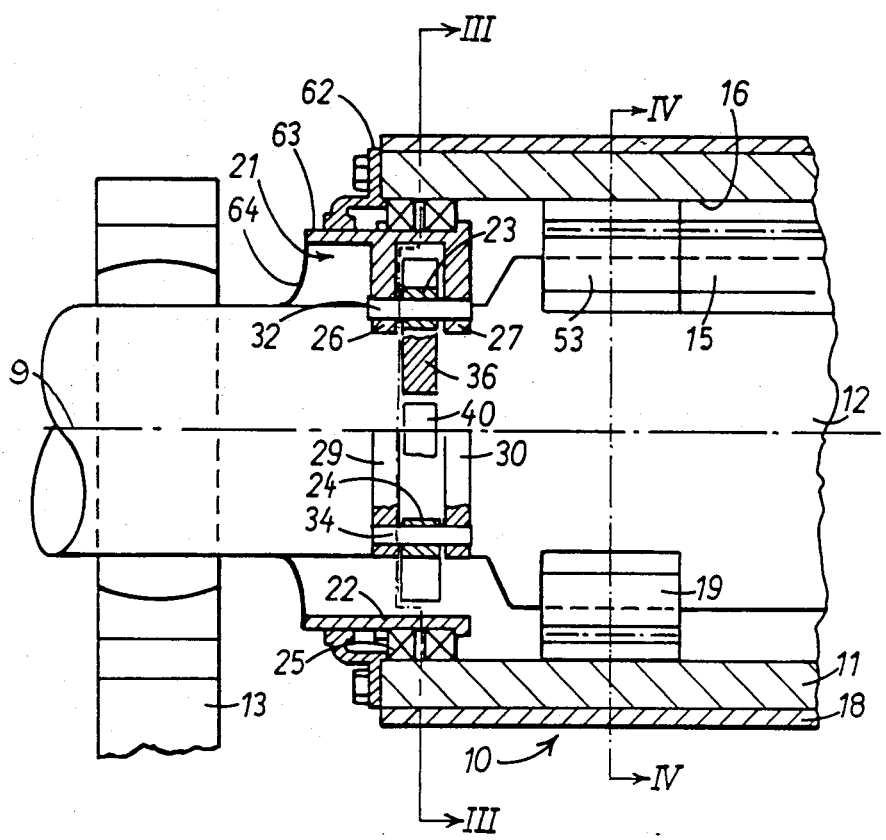
FIG. 2 is a side-elevational view of one end of the roll of this invention, partially in section, and illustrating the parallel pivot pins on either side of the longitudinal axis of the roll for the links as well as the opposed means for supporting and loading the roll shell.

The support beam 12 is in like manner provided with two opposed pairs of axially spaced, radially outwardly projecting, lugs 29,30, such as are visible in FIG. 2. Of the other pair, only one lug 31 is visible in FIG. 3. One end of link 23 is pivotally connected to lugs 26,27 by a pivot pin 32 while the other end is pivotally connected to the other pair of lugs of which only lug 31 is visible in FIG. 3, by a pivot pin 33. In a similar manner, one end of link 24 is pivotally connected to the pair of lugs 29,30 by a pivot pin 34 and its other end is pivotally connected to the pair of lugs, of which only lug 28 is visible in FIG. 3, by a pivot pin 35. The annular ring 22 is thus constrained by the links 23,24 to pivot and move relatively to the support beam 12 such that its longitudinal axis moves along an arcuate path relative to the longitudinal axis 9 of the support beam 12. Since the cylindrical shell is journaled to the annular ring 22, it also is constrained to move correspondingly relative to the support beam such that its longitudinal axis moves along an arcuate path relative to the axis of the support beam 12.

As can be readily appreciated, the two pairs of links at each end of the roll, with each link having one end pivotally attached to the shaft and its other end pivotally attached to the bearing ring, forms a four-bar linkage between each corresponding pair of links, the roll shaft and the bearing ring. For example, these would comprise items 23, 24, 12 and 22 in FIG. 3.

Figure 3:
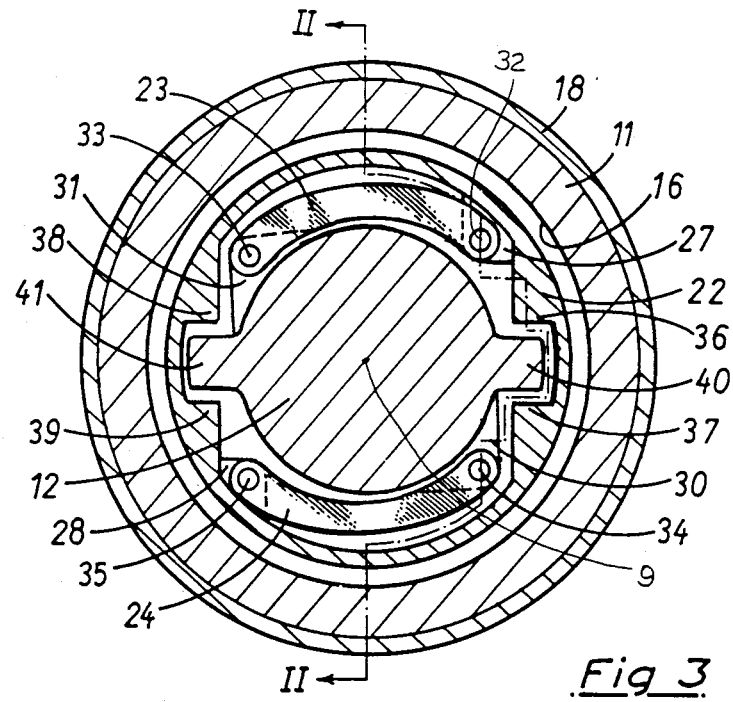
FIG. 3 is a cross-sectional end view of the roll of this invention along the section lines III—III of FIG. 2 showing the cylindrical roll shell in an intermediate position relative to the support beam.

An additional, unique characteristic of this invention resides in the double-pivoted construction between each corresponding pair of links, such as 23, 24 at one end of the roll. With the roll shell in an intermediate position with respect to the support beam, such as shown in FIG. 3, the pivot points 32, 33 and 34, 35 of each corresponding link 23 and 24, respectively, lie in a plane which is substantially transverse to a plane extending between the axes of a rotation between the rolls 10, 17. This configuration, including the link pivots 33, 34 on diametrically opposed sides of the support beam function to permit controlled translational movement essentially along the plane between the axes of rolls 10, 17 with very little distortion due to the operation of lower link 24 pivoting in a direction opposite to the direction of upper link 23 so as to bring the lower end of the bearing ring inwardly toward the axis 9 of the support shaft as the top side of the bearing ring rotates outwardly away from the axis 9 of the support shaft. This both optimizes the extent of translational travel permitted by the internal support links while minimizing the amount of lateral movement of the bearing ring relative to a theoretically perfectly straight path of translational travel along an imaginary plane between the axis 9, 8 of the support beams of rolls 10, 17, respectively.

With further respect to FIG. 3, the longitudinal axis of roll 10, support beam 12 and roll shell 11 are coincident with axis 9 shown. This is when the roll shell is in an intermediate, or neutral, position with all points on its surface equal distance from axis 9. When the roll support means are actuated and the roll shell moves translationally upwardly or downwardly, the longitudinal axis of rotation of the roll shell translates upwardly or downwardly a corresponding distance and then is no longer coincident with axis 9.

Also, when the roll shell is in its intermediate position shown in FIG. 3, each pair of links, such as 23, 24, on each end of the roll have their pivot points 32, 33 and 34, 35 in planes which are substantially parallel and which are substantially perpendicular to a plane containing both axis 9 and the nip line of contact with the mating roll in the intended press roll couple. The corresponding links at each end of the roll, such as links 23, 24, are in a parallel and opposed array. They are opposed to the extent that they are mounted on the support beam on either side of axis 9. In a preferred embodiment shown in FIG. 3, the nip line of contact with a mating roll would be in a vertical plane coincident with section II—II through axis 9. The links 23, 24 would then be on either side of a longitudinally extending plane through axis 9, and perpendicular to the vertical plane coincident with section II—II. This provides for maximum flexibility of operation in moving the roll shell with the same motion either upwardly or downwardly relative to axis 9 as well as moving the roll shell in as nearly straight line translational movement as possible.

The corresponding pivots on each end of the support beam, such as pivots 33, 34, and on the bearing ring on each end of the roll, such as pivots 32, 35 lie in a plane extending longitudinally along axis 9.

In order to limit the extent of relative movement between the annular bearing ring 22 and the support beam 12, the bearing ring is provided with diametrically opposed pairs of inwardly projecting stop members 36,37 and 38,39 and the support beam 12 is provided with a pair of radially outwardly projecting stops 40,41. In the intermediate position illustrated in FIG. 3, the stop 40 is disposed between the stop members 36,37 and the stop 41 is disposed between the stop members 38,39.

With reference to FIG. 5, when stop members 37,39 are adjacent stops 40,41, respectively, the linkage system has pivoted to bring the roll shell 11 into nipping engagement with mating roll 17. In the same manner, when the press roll 10 has been moved out of engagement with its mating roll 17, stop members 36,38 are in engagement with stops 40,41, respectively. This permits the roll shell to be disengaged without requiring continuous fluid pressure to be applied to the hydrostatic or hydrodynamic support means.

Figure 4:
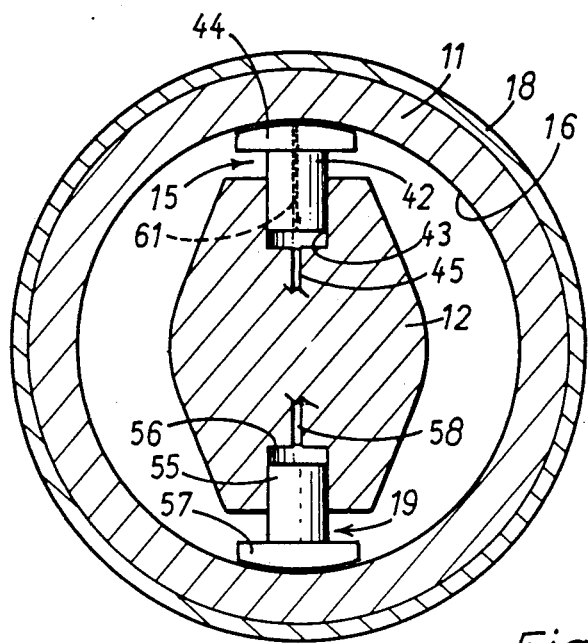
FIG. 4 is a cross-sectional end view of the roll of this invention along section lines IV—IV of FIG. 2.
Figure 7:
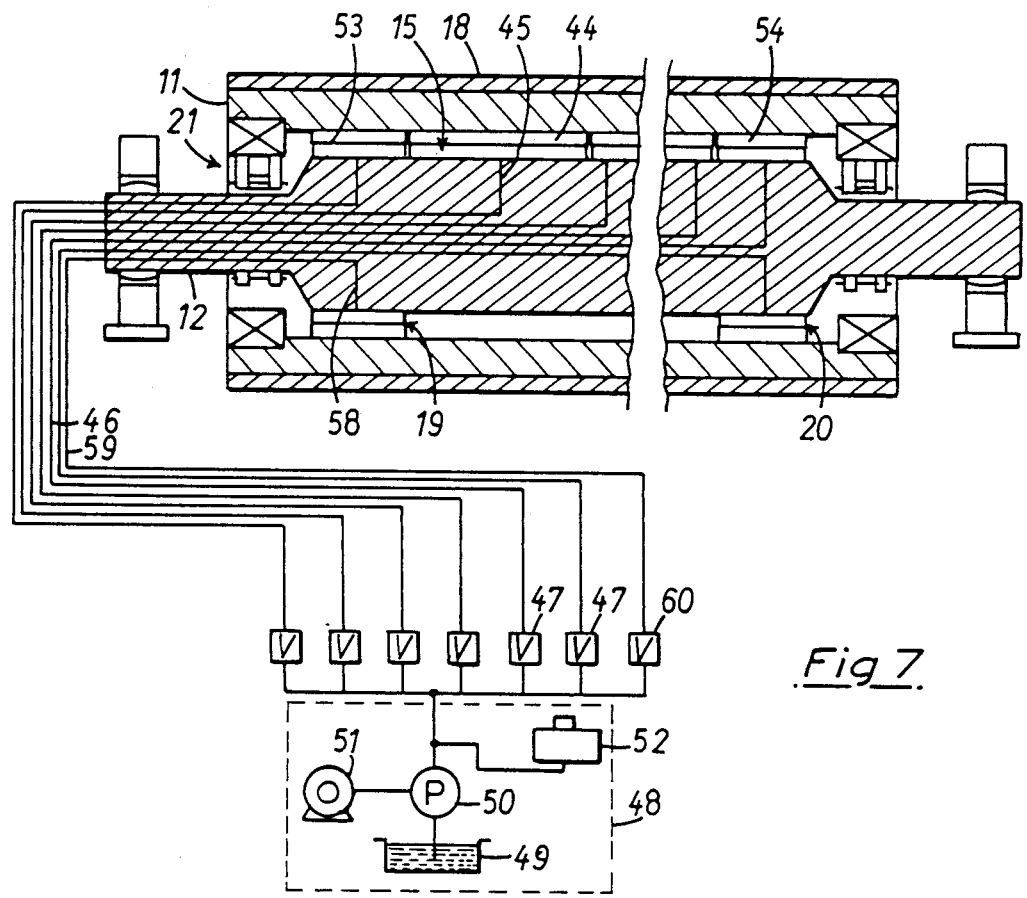
FIG. 7 is a side-elevational view of the roll of this invention, in section, and illustrating the plurality of fluid control means and their connections to the hydrostatic or hydrodynamic support means.

The hydrostatic or hydrodynamic support means are illustrated more clearly in FIGS. 4 and 7. Each of the support means 15 comprises a piston 42 slidably guided in a cylinder, or chamber, 43 in the support beam 12 and having a shoe 44 at its outer end which cooperates with the inner surface 16 of the cylindrical shell 11. A passage 45 communicates with the cylinder or chamber 43 and extends through one or the other end of the support beam 12 to communicate with a respective conduit 46 leading to a control valve 47. A separate passage 45, conduit 46 and valve 47 are associated with each of the hydrostatic or hydrodynamic support means and all of the valves 47 are connected to a hydraulic fluid pressure medium supply source illustrated diagrammatically at 48 and which may comprise a sump 49, pump 50 driven by a suitable prime mover 51, and an accumulator 52. Two opposed hydrostatic or hydrodynamic means 19,20 are disposed in the beam 12 to act in the direction opposite to the two hydrostatic or hydrodynamic support means 53,54 at the end regions of the cylindrical roll shell 11, and each comprise a piston 55 guided in a cylinder, or chamber, 56 and carry a shoe 57 cooperating with the inner surface 16 of this cylindrical roll shell 11. Separate passages and bores 58 and conduits 59 provide communication between the cylinders, or chambers, 56 and associated control valves 60.

When hydrodynamic support means are employed, separate arrangements are made for the supply and retention of a film of lubricant between each of the shoes and the inner surface of the cylindrical roll shell, and for scavenging used or excess lubricant from the inside of the cylindrical shell. Such arrangements are conventional and known in the art and have not been illustrated for the sake of clarity.

When hydrostatic support means are used, at least one throttling bore, such as 61, is provided in each piston and shoe such that the outer surface of the shoe 44 is in fluid communication with the inside of the chamber, or cylinder, 43 whereby hydraulic fluid in the cylinder, or chamber, 43 can flow to the outer surface of the shoe 44 to provide the necessary lubricating film between that surface and the inner surface 16 of the cylindrical roll shell 11 even when the roll shell is not moving over the shoe's surface.

Referring to FIG. 2, each end of the cylindrical roll shell 11 is closed by an end cover member 62 which is bolted to the end of the cylindrical roll shell 11 and fits around an extension 63 of the annular member 22. A sealing member 64 closes the gap between the annular member 22 and the support beam 12.

In operation, when it is desired to open the nip between the press roll 10 and the opposing roll 17, valves 47,60 are actuated to apply pressure medium, such as hydraulic fluid, to the opposed hydrostatic or hydrodynamic means 19,20, and to relieve pressure from the support means 15,53,54. The cylindrical roll shell is then positively moved away from its mating roll 17 and its path of movement is such that its longitudinal axis is constrained to move along an arcuate path relative to the longitudinal axis of the support beam 12 by the action of the linkage systems 21 at either end of the roll.

When it is desired to move the press roll 10 into nipping engagement with its mating roll 17, valves 47,60 are actuated to relieve the opposing means 19,20 of pressure and to apply pressure to at least the support means 53,54 in the end regions of cylindrical shell 11. The cylindrical shell is then moved into engagement with the opposing roll 17 and during such movement its longitudinal axis moves along an arcuate path relative to the longitudinal axis 9 of the support beam 12. Thereafter, by manipulation of the valves 47, the pressure of hydraulic fluid in each of the cylinders of the support means 15,53,54 can be controlled such that a uniform or predetermined pressure pattern can be established between the press roll 10 and the opposing roll 17 along substantially the entire working length, or face, of press roll 10.

In some operating situations, it is desired that press roll 10 be a driven roll. In this case, end member 62 can be provided with an axial extension 65 on which a ring gear 66 is mounted to engage with a pinion 67 on a driven shaft 68 as illustrated in FIG. 8.

In an alternative embodiment, the linkage system 21 can be disposed outside the axial length of roll shell 11. This is illustrated in FIG. 9 wherein the linkage system 21 includes an annular member 69 and, in place of the end member 62, an extension member 70 is bolted to the end of roll shell 11 and is journaled at 21 to the inner surface of the annular member 69. The annular gap between extension 70 and the annular member 69 is closed by a seal member 72 while the gap between the annular member 69 and the support beam 12 is closed by seal member 64.

Among the advantages of the described embodiments, it should be mentioned that the hydrostatic or hydrodynamic support means 15,53,54 and the opposing hydrostatic or support means 19,20 make it possible to move the press roll 10 into, and out of, pressing engagement with the opposing roll 17. This feature obviates the need for external means such as loading cylinders, air-ride springs and roll supporting arms that have hitherto been required. This not only considerably reduces the cost of manufacturing the roll, but also simplifies the use and operation of a press roll embodying the present invention. Indeed, the press roll of this invention is regarded as self-loading in that it includes means within its shell enabling it to be moved into and out of pressing engagement with its mating roll without the use of external means.

The elimination of the need for external loading cylinders and similar mechanisms that have hitherto been necessary with press rolls reduces vibration problems that have hitherto been encountered with such equipment. In addition, the elimination of loading cylinders, air-ride springs and external loading and support arms provides a more compact roll. An additional contribution to vibration damping is provided by the hydrostatic or hydrodynamic support means which support the cylindrical roll shell and provide a uniform or predetermined pressure pattern along the roll face when it is used in operation to press a traveling web.

Some variations in the construction of the self-loading controlled deflection roll described above and illustrated in the preferred embodiments can be made without departing from the spirit and scope of the invention. For example, the planes of the pivot points of the links on each end of the roll could be non-parallel to some extent. Also, corresponding pivot points of corresponding links on either end of the roll, such as pivots 33, 34 on the support beam, could conceivably not be in a longitudinally extending plane through axis 9 of the support beam. In both of these instances, it is not believed that such modifications would result in the operation and flexibility of the preferred embodiments previously described and illustrated in the drawings.

What is claimed is:

1. A self-loading controlled deflection press roll for use in selectively engaging a mating roll along a nip line contact therebetween, comprising:

a non-rotating support beam having a longitudinal axis;

a pair of bearing rings disposed about the support beam near each end thereof;

a roll shell rotatably mounted on the bearing rings;

support means disposed between the support beam and the roll shell for supporting the roll shell on the support beam;

a pair of opposed, spaced apart links at each end of the roll, each link of each pair of links having one end pivotally mounted to the support beam and the other end pivotally mounted to the bearing ring;

the pivots on the support beam of each pair of links being on opposite sides of a plane extending along the longitudinal axis of the beam and at substantially right angles with a longitudinally extending plane extending along the longitudinal axis of the beam and the intended nip line of contact with the mating roll;

whereby the links operating in conjunction with the support means can effect translational movement of the bearing rings and roll shell relative to the support beam.

2. A controlled deflection press roll as set forth in claim 1, wherein:

the links in each pair of links are of equal length.

3. A controlled deflection press roll as set forth in claim 2, wherein:

the corresponding pivots of each link of each pair of links on the shaft are diametrically opposed and are located in a plane extending along the longitudinal axis of the roll.

4. A controlled deflection press roll as set forth in claim 2, wherein:

the pivot points of the links of each pair of links at each end of the roll are in substantially parallel planes when the roll shell is in an intermediate position about the support beam.

5. A controlled deflection press roll as set forth in claim 2, wherein:

the pivots on the support beam of each link of each pair of links at each end of the support beam are of equal distance from the longitudinal axis of the support beam.

6. A self-loading controlled deflection press roll for use in selectively engaging a mating roll along a nip line of contact therebetween, comprising:

a non-rotating support beam having a longitudinal axis;

a pair of bearing rings disposed about the support beam near each end thereof;

a roll shell rotatably mounted on the bearing rings;

support means disposed between the support beam and the roll shell for supporting the roll shell on the support beam in each direction translationally relative to the longitudinal axis of the beam and the intended nip line of contact with the mating roll;

a pair of opposed, spaced apart links at each end of the roll, each link of each pair of links having one end pivotally mounted to the support beam and the other end pivotally mounted to the bearing ring and providing the sole guidance of the bearing rings relative to the support beam;

whereby the links operating in conjunction with the support means can effect translational movement of the bearing rings and roll shell relative to the support beam.

7. A self-loading controlled deflection press roll as set forth in claim 6, wherein:

the bearing ring on at least one end of the roll comprises an extension member which extends beyond the end of the roll shell, an annular member and includes a bearing disposed between the extension member and annular member;

the pair of links at either end of the roll being pivotally linked between the support beam and annular member beyond the end of the roll shell.

8. A controlled deflection press roll as set forth in claim 6, further including:

stop means on the support beam; stop members on at least one of the bearing rings, said stop members being arranged to interact with the stop means to limit the translational movement of said bearing ring about the support beam.

* * * * *